United States Patent Office 3,244,595
Patented Apr. 5, 1966

3,244,595
COMPOSITION FOR ADMINISTERING
VITAMINS A, D, AND E
William H. Feigh, Indianapolis, Ind., assignor to Mattox and Moore, Inc., Indianapolis, Ind., a corporation of Indiana
No Drawing. Filed May 7, 1965, Ser. No. 454,169
9 Claims. (Cl. 167—81)

This application is a continuation-in-part of my co-pending application Serial No. 244,893, filed December 17, 1962.

This invention relates to a method and composition for administering to livestock water-insoluble, fat-soluble vitamins, especially vitamin A and combinations of vitamin A with the other fat-soluble vitamins D and E.

It is known to supplement the natural supply of vitamin A, and vitamins D and E, by including supplemental quantities of these fat-soluble vitamins in the feed of livestock. But various conditions and circumstances occur in which such feed supplement is ineffective or insufficient. For example, when feeder cattle are shipped from the range to feed lots, their access to feed and water is limited and irregular and their feed is often of poor quality and low vitamin content; and they suffer shock both from these feeding conditions and from the stress of handling and movement in the shipping. As a result, their reserves of vitamin A, and of the other fat-soluble vitamins, are depleted, and their blood levels of the vitamins are low at a time when high levels are especially needed to combat infection and to overcome the shock effects. The cattle under these circumstances show a loss of appetite and a low feed intake, so that their vitamin deficiency is not overcome by vitamins consumed with feed. Vitamin deficiency and poor vitamin uptake can also occur even in cattle which consume adequate quantities of vitamin-rich or supplemented feed, as from illness or from other feed deficiencies.

Various proposals have been made for overcoming such deficiencies of the fat-soluble vitamins, such as vitamin A. For example, it has been proposed to administer these vitamins in oil or oily mixtures, either orally or by injection. Oral administration, other than in the feed, is relatively difficult and its effects are variable and unreliable. Injection of the vitamins in oil is also unreliable and produces only a relatively low vitamin uptake. The failure of oil injections to produce reliable and effective increases in vitamin A levels is believed to be caused by relatively long retention of the vitamin in and around the site of injection and by destructive oxidation of the vitamin A during such retention, with consequent loss of vitamin potency.

It has also been proposed to inject aqueous dispersions of fat-soluble vitamins. See, for example, Christensen, et al., Nord. Vet. Med., 10: 49 (1958). This proposal suffers several practical disadvantages. The material in liquid form is not easily injected on a mass basis when large numbers of cattle or other livestock are to be treated, and relatively large-volume injections are required. The liquid material must be protected from both high and low temperatures and for this reason its use becomes difficult or impractical in cold seasons when administration may be especially desirable.

It is the object of the present invention to provide a method and composition which will greatly facilitate routine and mass administration of fat-soluble vitamins, especially vitamin A, with or without vitamins D and E; which will produce good absorption of the vitamins and a high rate and efficiency of vitamin uptake, without the danger of destructive oxidation such as occurs with oil injections, and with a vitamin uptake as good or better than that obtained with aqueous dispersions. It is a special object of the invention to provide a composition and method in which the fat-soluble vitamins A, D, and E are contained in high concentration, and in uniform and stable distribution in combination with a water-soluble carrier in a substantially water-free composition of semi-solid consistency which can be administered at any normal environmental temperature from a pressure injection gun, such as that disclosed in Patent No. 2,624,338, to administer on a mass administration basis uniform small doses which contain effective quantities of the vitamins. It is a further object of the invention to provide such a composition in which the vitamins, and especially vitamin A, will remain stable both during distribution, storage, and use. It is a further object of the invention to provide such a composition which on intramuscular injection produces a rapid and effective uptake of the vitamins without loss of vitamin potency.

In accordance with the invention, the fat-soluble vitamins are combined in a substantially water-free, homogeneous composition with a water-soluble carrier comprising polyethylene glycol, preferably a mixture of polyethylene glycol 4000 and a plasticizer such as a polyhydric alcohol plasticizer and preferably polyethylene glycol 200. The composition may also contain other components, such as preservatives, etc., and desirably contains one or more emulsifier or dispersing agents. When vitamin A is present, anti-oxidant material is also included.

The polyethylene glycols mentioned are so-called water-soluble waxes and a series of them are available on the market under the trademarks "Carbowax 4000," "Carbowax 200," etc. Polyethylene glycol 400 is a mixture of polyethylene glycols having an average molecular weight of 4000, and is of normally solid and rigid consistency which progressively softens on heating. Polyethylene glycol 200 is a corresponding mixture having an average molecular weight of 200 and is a water-soluble wax of liquid consistency.

The fat-soluble vitamins are readily intermixed with the water-soluble polyethylene glycol carrier. They form a clear mixture or solution therewith when heated, and when this is cooled, the vitamins are contained in uniform and stable distribution throughout the composition. Desirably, the composition is normally of semi-solid or paste-like consistency which resists flow and deformation in the absence of force but which is readily deformed and extruded through a hollow needle under administration pressure. On intramuscular administration, the water-soluble carrier is dissolved by the body fluids and the vitamin uptake is rapid and effective.

A composition for administering vitamins A, D, and E may be prepared in a potency such that unit-dose quantities of 0.226 cc. each contain the desired dosage corresponding to a predetermined animal body weight; and such composition can be administered from multiple-dose cartridges with the gun of Patent No. 2,624,338, and one or more unit doses can be given by actuating the gun one or more times depending on the body weight of the animal being treated.

A composition for such administration may comprise the following:

(1) *Vitamin A.*—The amount of vitamin A present is desirably relatively high, as of the order of 250,000 I.U. (international units) per unit dose, but may be lower depending on the dosage desired and the potency of the vitamin A source material used. Indeed the efficient and effective vitamin uptake which the invention produces permits the use of lower dosages and concentrations than would otherwise be practical. The vitamin A source material used is preferably vitamin A itself, that is, as the mono-hydroxy alcohol, having a potency of the order of 3,300,000 I.U. per gram, in which case the fat-soluble vitamin A material constitutes approximately 40 percent or more of the total composition. Other vitamin A source materials may also be used, such as the aliphatic esters of vitamin A, including the acetate and the palmitate, and vitamin A aldehyde. Various natural products having vitamin A potency may also be used, such as purified fractions of fish liver oils. Vitamin $A_2$ may be used.

Instead of materials which themselves contain vitamin A activity, the composition may contain materials such as carotenoids which are precursors for vitamin A in the animal body. These include the various forms of carotene, such as the alpha and gamma forms, and especially the beta form. I include these in the term "vitamin A materials."

(2) *Vitamin D.*—The choice of vitamin D activity will depend on the animals to be treated, for vitamin $D_2$ is generally preferable for livestock, while $D_3$ is especially valuable for poultry. The source materials used may also vary. Vitamin $D_2$ may be present as calciferol, which is obtainable as an oil-soluble crystalline material of high potency or as an ester or other active compound. Also, a crude mixture may be used in which vitamin $D_2$ activity is produced by radiation. Corresponding sources of vitamin $D_3$ may be used. The amount of vitamin D activity used may vary, say from 1000 to 2500 I.U. per unit dose of composition.

(3) *Vitamin E.*—This component serves both to provide desirable vitamin activity and as an anti-oxidant for the vitamin A. It may be present as a pure compound, such as alpha-tocopherol and active compounds thereof, for example, the acetate, succinate, and other esters. Any of the active isomeric forms may be used, including the dl- and d-forms of the compounds mentioned. Also, natural materials and extracts having vitamin E activity may be used. As with the other vitamins, the amount used may be selected to give the desired dosage, for example, to provide 25 I.U. per unit dose.

(4) *Anti-oxidants.*—Various anti-oxidants for vitamin A are known, and any non-toxic injectable ones of these may be used, such as ascorbic acid, citric acid, etc. I prefer to use a combination of butylated hydroxyanisole and butylated hydroxytoluene in equal proportions. The amount used will depend on the amount of vitamin E present in the composition. With alpha-tocopherol present to provide 25 I.U. of vitamin E activity, the preferred anti-oxidants may be used at the rate of at least 0.8 mg. each or 1.6 mg. total for each 250,000 I.U. of vitamin A activity present.

(5) *Emulsifier or dispersing agent.*—It has previously been proposed to use emulsifiers in injections of fat-soluble vitamins for the purpose of enhancing the utilization of the vitamins from intramuscular injections; and my compositions preferably contains an emulsifier for this purpose. Various types of emulsifiers or water dispersing agents are known which are non-toxic and injectable in suitable amounts. The various types of emulsifiers include anionic compounds, such as triethanolamine stearate, dioctyl sodium sulfosuccinate, sodium lauryl sulfate, etc.; cationic compounds, such as various quaternary compounds, for example, cetyltrimethylammonium bromide; and various non-ionic compounds, such as lecithin and compounds available on the market under the trade names "Ethomid," "Tween," and "Span." I have used polysorbate mono-oleate, available as "Tween 80," in a quantity of 9 mg. per unit dose of 0.226 cc. of composition.

(6) *Polyethylene glycol.*—This is preferably a mixture of polyethylene glycol 4000 (polyethylene glycols having an average molecular weight of 4000) and a plasticizer, preferably a polyethylene glycol 200 (a mixture having an average molecular weight of 200). The polyethylene glycol 4000, available as "Carbowax 4000," is a water-soluble wax of normally solid and rigid consistency which progressively softens and melts on heating, while the polyethylene glycol 200, available as "Carbowax 200," is a water-soluble wax of liquid consistency. This carrier component of the composition serves a number of purposes. In the mixture herein contemplated, it intermixes with the fat-soluble vitamins at liquifying temperatures to give a clear liquid mixture or solution, which becomes a yellowish opaque semi-solid or paste-like material on cooling. The polyethylene glycols have solubilizing and bacteriostatic properties. The solidified paste-like material contains the fat-soluble vitamins in a uniform distribution which remains stable during handling, shpiment, and use. The stable composition is readily administered on a mass administration basis from a pressure injection gun such as that of Patent No. 2,624,338, and its uniformity and consistency permits administration of accurate quantities containing predetermined amounts of vitamin activity. The composition is water free, and hence stable and injectable over a wide range of temperatures. When injected in the animal body, the carrier is soluble in the body fluids and the vitamin activity is rapidly and efficiently absorbed and utilized. A relatively small amount of polyethylene glycol mixture serves to carry a relatively large amount of fat-soluble vitamins, and only that amount need be used which will form a clear mixture with the vitamins and will remain in stable intermixture therewith on cooling. For this, it appears desirable to have at least 30 percent of normally-liquid polyethylene glycols. In a preferred composition of vitamins A, D, and E, I have used approximately 10 percent of a mixture containing 70 percent polyethylene glycol 4000 and 30 percent polyethylene glycol 200, and this small amount is sufficient in a composition containing approximately 80 percent of fat and fat-soluble vitamins. Greater amounts of polyethylene glycol carrier can also be used without reducing the utilization of the vitamin activity in the body, and the proportions of normally-liquid polyethylene glycols can be increased from the 30 percent mentioned to 50 percent or more depending on the consistency desired. At least 5% of normally solid polyethylene glycol is desirably used.

(7) *Added fat.*—Since the oily vitamin source materials vary in potency, it will be recognized that the less potent materials will introduce more or less inactive fat. For uniformity of compounding, it is desirable to include sufficient fat to contain the vitamin activity in a standard total. For this purpose, an added fat such as hydrogenated vegetable oil, for example, hydrogenated coconut oil, corn oil, cottonseed oil, peanut oil, sesame oil, and the like, may be included in quantity sufficient to yield the desired total.

(8) *Preservative.*—A small quantity of preservative may be included to supplement the bacteriostatic action of the polyethylene glycol mixture. A number of preservatives are known which are non-toxic in the quantities injected. One suitable preservative is benzyl alcohol.

It is surprising that a composition of the character described above can be made to contain such a relatively large proportion, of the order of 70 percent, of vitamin A and that this can be dispersed in such a relatively small quantity of dispersant and carrier components. It is also surprising and unpredictable that the water-insoluble vitamins are absorbed as rapidly and as effectively from a composition of this character as appears to be the case.

The following examples illustrate the invention:

EXAMPLE 1

A mixture of 72.5 gms. of polyethylene glycol 4000 and 32.5 gms. of polyethylene glycol 200 is prepared by heating the two components together and stirring to produce a uniform liquid material. This is combined with other components, in amounts as follows.

| Component: | Quantity (gms.) |
|---|---|
| Vitamin A alcohol, 3,300,000 I.U./gm., 1,250,000,000 units | 378.79 |
| Vitamin D (calciferol), 40,000 I.U./mg., 12,500,000 units | 0.31 |
| Vitamin E (dl-alpha-tocopherol), one I.U./mg., 125,000 units | 125.00 |
| Butylated hydroxyanisole | 4.00 |
| Butylated hydroxytoluene | 4.00 |
| Benzyl alcohol | 22.50 |
| "Tween 80" | 45.00 |
| Polyethylene glycol mixture | 105.00 |
| Hydrogenated coconut oil (q.s.) | 315.40 |
| | 1000.00 |

The mixture was heated at liquifying temperature and stirred, and formed a clear liquid. This was filled, while still in liquid state, into cylindrical cartridges, stoppered at one end, in approximately 12 cc. amounts, sufficient for 50 shots of 0.226 cc. or 0.2 gm. each. The filled cartridges were cooled to room temperature, at which the composition thickened to a semi-solid paste-like consistency, and the open ends of the cartirdges were then stoppered. The stoppers were puncturable stoppers and the cartridges were of a size to fit a commercial injection gun substantially as disclosed in Patent No. 2,624,338 which administered unit-dose quantities of 0.226 cc. or 0.2 gm. on each actuation of the gun handle. Each such unit dose or shot contained 250,000 I.U. of vitamin A, 2,500 I.U. of vitamin D, and 25 I.U. of vitamin E.

EXAMPLE 2

Example 1 is repeated, save that the vitamin D and E components are omitted, and the amounts of antioxidant materials are increased, as to 10 gm. each, to compensate for the anti-oxidant effects of the omitted vitamin E.

EXAMPLE 3

Compositions like that of Example 1 are prepared which contain only vitamin D or E alone in higher concentrations, and containing at least 10 percent of the polyethylene glycol mixture. Since vitamins D and E are stable, the anti-oxidants may be omitted.

EXAMPLE 4

Example 1 is repeated, save that instead of using vitamin A alcohol, vitamin A palmitate is used. Since this has a potency of only 1,800,000 I.U. per gram, the hydrogenated coconut oil is omitted, and a total of 693.2 gm. of the vitamin A palmitate is used; which gives a composition having substantially the same potency as in Example 1.

EXAMPLE 5

The composition as prepared in Example 1 was administered to cattle, using the gun of the type disclosed in Patent No. 2,624,338. Eight Hereford steers, each weighing about 500 pounds, and from the same pasture background, were individually marked with numbered tags and each was biopsied for a background liver vitamin A level prior to injection. Each steer was then injected with the vitamin A, D, E composition, subcutaneously on the left side of the neck. In each injection, the gun was operated twice—once for each 250 pounds of body weight—to give a total dosage of 0.452 cc. of composition, containing 500,000 international units of vitamin A. Seven days after the injection, a subsequent biopsy was made to obtain the liver vitamin A level. The following results were obtained:

Table A

VITAMIN A INJECTION IN BEEF CATTLE

[Vitamin A level in liver (micrograms per gram of liver)]

| Steer Tag No. | Background Biopsy | Test Biopsy | Difference |
|---|---|---|---|
| 105 | 5.53 | 31.86 | 26.33 |
| 104 | 22.57 | 60.04 | 37.47 |
| 44 | 30.11 | 51.97 | 21.86 |
| 109 | 27.79 | 18.82 | −8.97 |
| 49 | 27.86 | 42.66 | 14.80 |
| 50 | 34.56 | 48.92 | 14.36 |
| 45 | 36.70 | 51.53 | 14.83 |
| 53 | 27.60 | 36.49 | 8.89 |
| Averages | 26.59 | 42.79 | 19.79 |

From the above table it will be noted that the injection produced, at the end of seven days, an increase of the vitamin A level in the liver of nearly 20 micrograms per gram of liver, or a percentage increase over the background level of vitamin A in the livers of the same animals, of 74.42 percent.

In steers of this weight, the livers weigh approximately 10 pounds. On this basis, the test results indicate that the injections produced an approximate uptake of vitamin A of 299,489 international units per animal. On the basis of the 500,000 unit dosage, such liver uptake was 59.9 percent of the administered dose, which is a remarkable uptake for the dose level administered. Further, the differences found were highly significant statistically, and (using Fischer's "t" test) indicated that the same result could be expected to happen, statistically speaking, over 99 times out of 100.

EXAMPLE 6

A further test indicates the rapidity of vitamin A uptake. Ten heifers, weighing 800 to 950 pounds and averaging about 850 pounds, with the same pasture background, were injected subcutaneously in the side of the neck with the composition as set forth in Example 1, using an injection gun as before. The gun was actuated four times for each injection—once for each 200–250 pounds of body weight—to give a dosage of one million U.S.P. units of vitamin A in each administration. Liver biopsies were taken prior to the injection, and at 18 hours, 31 hours, and 76 hours, respectively, after the injection. The biopsy assay procedure was by the method of Ames et al., "Simplified Procedure for Extraction and Determination of Vitamin A in Liver," Analytical Chemistry 26 (8): 1378-1381 (1954). Moisture was checked and corrected to a common denominator of 70 percent. The following results were obtained:

Table B

| Time of Biopsy | International units per gram of liver | Percent Increase over background |
|---|---|---|
| 0 hour (background) | 34.55 | |
| 18 hours | 58.87 | 69 |
| 31 hours | 81.16 | 130 |
| 76 hours | 122.34 | 250 |

It will be seen from the results of this experiment that the vitamin A uptake following administration of compositions in accordance with the present invention is both prompt and rapid.

EXAMPLE 7

Injectable compositions in accordance with the invention may contain hydrogenated vegetable fats other than coconut oil, such as hydrogenated corn oil, cotton seed oil, peanut oil, and sesame oil, all of which are known for use in injectable compositions. Also, the proportion of polyethylene glycol used may be varied up to about 20 percent in compositions which form clear, single-phase mixtures with the vitamins and fat when melted therewith and which thicken when cooled to room temperature.

Five parts pure vitamin A alcohol was mixed with three parts of a commercial fat consisting of a mixture of partially hydrogenated vegetable oils, primarily cotton seed oil and soy bean oil, and this vitamin-fat mixture was mixed in various proportions with a mixture of seven parts polyethylene glycol 4000 and three parts polyethylene glycol 200, and the resulting mixtures were heated to liquifying temperature. Clear melts were obtained with the polyethylene glycol ranging up to 20 percent, but the melts became cloudy when the polyethylene glycol was 30 percent or more. In cooling to room temperature, the clear melts thickened to opaque semi-solid compositions. Like results were obtained using polyethylene glycol 4000 alone, without polyethylene glycol 200.

I claim:

1. A composition for injection administration of fat-soluble vitamins of the class consisting of vitamins A, D, and E to animals for rapid utilization thereby, comprising a substantially water-free, uniformly admixed, semi-solid mixture containing
    vitamin A source material to provide up to approximately 1,250,000 I.U. of vitamin A activity per gram of composition,
    co-present hydrogenated vegetable fat in sufficient quantity to make a total with the vitamin A source material of approximately 70 percent by weight of the total composition,
    up to about 15 percent of other fat-soluble vitamin material containing vitamins of said class,
    a water-soluble polyethylene glycol mixture in an amount which forms a clear, single-phase mixture with the vitamins and fat when melted therewith and including normally-solid polyethylene glycol in an amount of at least about 5 percent of the total composition to thicken the same when cooled to room temperature,
    a minor proportion of emulsifying agent,
    a minor proportion of anti-oxidant for the vitamin A,
    and a minor proportion of benzyl alcohol as a preservative.

2. A composition as set forth in claim 1 in which said co-present fat is hydrogenated coconut oil.

3. A composition as set forth in claim 1 in which the emulsifying agent is of the class consisting of polyoxyethylene sorbitan esters of fatty acids.

4. A composition as set forth in claim 1 in which the carrier comprises polyethylene glycol 4000 and polyethylene glycol 200.

5. A composition as set forth in claim 1 in which the normally-liquid polyethylene glycol constitutes at least 30 percent of the water-soluble carrier.

6. A composition as set forth in claim 5, containing of the order of 1,000,000 I.U. of vitamin A activity per gram.

7. A composition as set forth in claim 6, also containing of the order of 10,000 units of vitamin D per gram.

8. A composition as set forth in claim 6, also containing of the order of 100 units of vitamin E per gram.

9. A composition for injection administration to animals of fat-soluble vitamins of the class consisting of vitamins A, D, and E, comprising a substantially water-free, uniformly admixed, semi-solid mixture containing
    approximately 50 percent of fat-soluble vitamin material of the class consisting of vitamin A, vitamin D, vitamin E and mixtures thereof, containing vitamin A to provide up to approximately 1,250,000 I.U. of vitamin A activity per gram of composition,
    approximately 30 percent of hydrogenated coconut oil,
    approximately 10 percent of water-soluble polyethylene glycol mixture containing at least 50 percent of normally-solid polyethylene glycol of high molecular weight and the balance of normally-liquid polyethylene glycol,
    a small proportion of antioxidant for the vitamin A,
    approximately 4 percent of polysorbate mono-oleate, and
    a minor amount of benzyl alcohol as a preservative.

References Cited by the Examiner

UNITED STATES PATENTS

| | | | |
|---|---|---|---|
| 2,310,479 | 2/1943 | Vollmer | 167—81 |
| 2,681,297 | 6/1954 | Moore | 167—53.1 |
| 2,744,851 | 5/1956 | Halpern | 167—58 |
| 3,017,323 | 1/1962 | Gordon | 167—65 |

References Cited by the Applicant

UNITED STATES PATENTS 3,036,957  6/1962  Lehman.

JULIAN S. LEVITT, *Primary Examiner.*